US011565891B2

(12) United States Patent
Klein (10) Patent No.: US 11,565,891 B2
(45) Date of Patent: Jan. 31, 2023

(54) ACTUATING APPARATUS FOR ACTUATING A SEPARATING DEVICE FOR A GRAVITATIONAL CONVEYOR

(71) Applicant: Euroroll GmbH, Werne (DE)

(72) Inventor: Thomas Klein, Drensteinfurt (DE)

(73) Assignee: EUROROLL GMBH

( * ) Notice: Subject to any disclaimer, the term of this patent is extended or adjusted under 35 U.S.C. 154(b) by 0 days.

(21) Appl. No.: 17/269,696

(22) PCT Filed: Aug. 21, 2019

(86) PCT No.: PCT/EP2019/072385
§ 371 (c)(1),
(2) Date: Feb. 19, 2021

(87) PCT Pub. No.: WO2020/039003
PCT Pub. Date: Feb. 27, 2020

(65) Prior Publication Data
US 2021/0316950 A1    Oct. 14, 2021

(30) Foreign Application Priority Data
Aug. 21, 2018   (DE) .................... 10 2018 120 404.3

(51) Int. Cl.
*B65G 47/88*   (2006.01)
*B65G 13/075*  (2006.01)

(52) U.S. Cl.
CPC ....... *B65G 47/8815* (2013.01); *B65G 13/075* (2013.01); *B65G 47/8823* (2013.01); *B65G 47/8853* (2013.01)

(58) Field of Classification Search
None
See application file for complete search history.

(56) References Cited

U.S. PATENT DOCUMENTS 3,532,201 A * 10/1970 McConnell ............ B65G 47/29
                                                                 221/13
3,810,534 A    5/1974 Prete
5,890,577 A *  4/1999 Faisant ............... B65G 47/8823
                                                                198/463.4

FOREIGN PATENT DOCUMENTS

BE    753336 A    1/1971
DE    3035338 A1  5/1982
(Continued)

OTHER PUBLICATIONS

International Search Report and Written Opinion for PCT/EP2019/072385, dated Dec. 20, 2019, 14 pages.

*Primary Examiner* — William R Harp
(74) *Attorney, Agent, or Firm* — Luedeka Neely Group, PC (57) ABSTRACT

A separating device for a gravity conveyor, comprising a conveying plane (E) along which an item (30) is conveyable in a conveying direction (F), and an actuating means (50), which comprises a first actuating member (51), which can be moved into an actuated position by conveyed items (30) being moved in the conveying direction (F), and a second actuating member (52), which can be moved into an actuated position by conveyed items (30) being moved counter to the conveying direction (F). When at least one of the first and second actuating members (50, 51) is actuated, a movement of the at least one separating stop (40) from the position above the conveying plane is blocked, and when the first and second actuating members (50, 51) are unactuated, a movement of the at least one separating stop (40) to a position below or flush with the conveying plane is enabled.

23 Claims, 5 Drawing Sheets

(56) References Cited

FOREIGN PATENT DOCUMENTS

| EP | 1213242 | A1 | 6/2002 |
| EP | 0968938 | B1 | 12/2002 |
| EP | 3263493 | A1 | 1/2018 |

* cited by examiner

ACTUATING APPARATUS FOR ACTUATING A SEPARATING DEVICE FOR A GRAVITATIONAL CONVEYOR

This application is a Section 371 national phase entry of PCT application PCT/EP2019/072385, filed Aug. 21, 2019. This application also claims the benefit of the earlier filing date of German patent application 10 2018 120 404.3, filed Aug. 21, 2018.

FIELD OF THE INVENTION

The invention relates to a separating device for a gravity conveyor, in particular a gravity roller conveyor, having a conveying plane which is defined by at least one guide for conveying the items to be conveyed. The separating device serves to remove the conveyed items, such as for example pallets, cases or the like, without an accumulation of pressure. The gravity conveyor usually comprises a conveying part and a removal station which is separated from the conveying part by the separating device. The separating device separates conveyed items situated in the removal station, which have generally been conveyed into the removal station by the conveying part, from the subsequent items being conveyed, i.e. the items being conveyed in the conveying part. Conveyed items situated in the conveying part and/or the subsequent items to be conveyed can be queued at the separating device, i.e. the separating device separates the conveyed items situated in the removal station from the subsequent items to be conveyed. This prevents the subsequent items being conveyed from running into or pressing against the conveyed items situated in the removal station, thus preventing the successively conveyed items from hampering removal. In this way, the conveyed items to be removed can be removed from the removal station without an accumulation of pressure, for example by means of a lifting truck or forklift truck.

BACKGROUND OF THE INVENTION

The prior art discloses gravity conveyors, in particular gravity roller conveyors, comprising a separating device which separates the conveyed items to be removed from the subsequent items to be conveyed. Document DE 20 2011 005 138 U1, for example, discloses a gravity conveyor in which the conveyed item entering the removal station actuates an actuating member. Actuating the actuating member causes a separating stop to be moved from a position below the conveying plane to a position above the conveying plane, thus preventing subsequently conveyed items from entering the removal station. The actuating member is tongue-shaped and inclined in relation to the conveying plane such that conveyed items entering the removal station pivot the actuating member about a pivot axis from a position above the conveying plane. In DE 20 2011 005 138 U1, the actuating member is reset manually by an operator, whereby the separating stop releases the subsequently conveyed items in order for them to enter the removal station.

The prior art also however discloses gravity conveyors in which the actuating member is automatically reset, for example by a spring force, from the actuated position to the unactuated position, as soon as the conveyed item has been removed from the removal station.

Known actuating members have the disadvantage that the actuating member can only be actuated in the conveying direction. In practice, it can very much occur that conveyed items are removed from the removal station, after which it is found that the items should not have been removed from the removal station at all, but rather different items from another gravity conveyor. In this case, the operator will want to return the conveyed items to the removal station. With known actuating members, however, there is a risk of them being damaged or destroyed when the erroneously removed conveyed item is replaced, since replacing it involves moving the conveyed item counter to the usually envisaged conveying direction, whereas the known actuating members are only designed to be actuated by conveyed items moving in the conveying direction and not by conveyed items moving counter to the conveying direction.

SUMMARY OF THE INVENTION

Separating devices are also known from EP 2 517 982 B1 and DE 696 01 864 T2.

The invention is based on the object of providing a separating device for a gravity conveyor in which the conveyed items can be replaced or pushed back without damaging the separating device in the process.

The invention is based on a separating device for a gravity conveyor, in particular a gravity roller conveyor. Gravity conveyors are for example used to transport items to be conveyed. The items to be conveyed may for example be cases, boxes or pallets, in or on which multiple items are arranged. Gravity conveyors are characterized by a slight inclination relative to the horizontal (in relation to the direction of gravity). Due to this slight inclination, a downward gradient force acts on the items to be conveyed, moving them along a conveying plane towards of a removal station. The conveying plane is defined by at least two guides for guiding the items to be conveyed. The items to be conveyed can be guided along or parallel to the conveying plane. The at least two guides can be formed by conveying rollers or sliding rails.

A roller conveyor can in particular comprise a framework to which a plurality of conveying rollers are rotatably fastened. Such conveying rollers are also known to the person skilled in the art as "load-bearing rollers". The items to be conveyed are moved along or transported on the conveying rollers, such that the items to be conveyed roll off on the conveying rollers, thus enabling even heavy loads to be moved with relatively little effort and with little friction. The roller conveyor can be arranged horizontally or inclined relative to the horizontal, for example at a gradient of 2 to 10%, preferably 4%, whereby the driving force acts on the items to be conveyed in accordance with the inclination. Such inclined roller conveyors are also referred to as gravity roller conveyors.

The roller conveyor includes, for example at one end, a removal station at which the conveyed items can be removed or picked up from the roller conveyor. An end stop can be formed at the removal station, against which the conveyed item to be removed rests, thus preventing it from moving further in the conveying direction once it is situated in the removal station. Since subsequently conveyed items would exert an accumulation of pressure on the conveyed item to be removed, i.e. the conveyed item to be removed would become trapped between the end stop and the subsequent items being conveyed, a separating device in accordance with the invention is provided which prevents the subsequently conveyed items from being able to exert an accumulation of pressure on the conveyed item situated in the removal station. The conveying rollers or the sliding rail generally define a guide for guiding the items to be conveyed.

The conveying rollers can each be rotatable relative to a framework about an axis of rotation which is spatially fixed relative to the framework, whereby rolling friction occurs between the items to be conveyed and the conveying rollers. The conveying rollers can also be rotationally fixed relative to the framework, such that sliding friction occurs between the items to be conveyed and the conveying rollers. The tangent onto the circumferences of the at least two conveying rollers forms the conveying plane and substantially corresponds to the lower side of a level conveyed or transported item, for example a pallet, resting on or rolling off on the at least two conveying rollers.

If the guide is formed by a sliding rail, the contact surface of the sliding rail which is designed to contact the items to be conveyed can form or define the conveying plane. The sliding rail can be embodied to exhibit low friction, such as for example by being made of plastic. Suitable plastics include for example polytetrafluoroethylene, polyacetal, etc. The sliding rail can for example be screwed to the framework and/or embodied to be elongated such that its longitudinal direction extends in the conveying direction or in the longitudinal direction of the framework.

The separating device comprises at least one stop which acts as a separating stop in that it separates the subsequently conveyed items from the conveyed items situated in the removal station. The stop can be moved, in particular back and forth, between a position in which it is situated above the conveying plane and a position in which it is situated below or flush with the conveying plane, preferably pivoted about a pivot axis which is spatially fixed in relation to the conveying plane or spatially fixed in relation to a framework (fixed to the framework) of the conveyor or the separating device. The position in which the at least one separating stop is below the conveying plane is to be understood to include the position in which the at least one separating stop is flush with the conveying plane. In the position below the conveying plane, the items to be conveyed can be moved past the stop, since the stop does not block the movement of the items to be conveyed. In the position above the conveying plane, the stop blocks the movement of the conveyed items into the removal station. There is a gap, in which the stop is arranged, between the conveyed item situated in the removal station and the immediately following conveyed item. The stop prevents the immediately following conveyed item from following on towards the removal station, such that the conveyed item in the removal station is free of any accumulation of pressure from the immediately following conveyed item.

The separating device comprises an actuating means which can be actuated by the conveyed items being moved in the conveying direction, in particular into the removal station, and in particular by conveyed items being moved counter to the conveying direction, in particular into the removal station. The actuating means is for example unactuated when no item to be conveyed is acting on it. Generally, the actuating means can be actuated by an item to be conveyed acting on it.

The actuating means in accordance with the invention comprises a first actuating member and a second actuating member for actuating it. The actuating means, for example the first actuating member and/or the second actuating member, is coupled to the at least one separating stop in such a way, i.e. interactively, that when the actuating means is actuated, a movement of the at least one separating stop from the position above the conveying plane to the position below the conveying plane is blocked, and when the actuating means is unactuated, a movement of the at least one separating stop from the position above the conveying plane to the position below the conveying plane is enabled. In particular, the actuating means can additionally be coupled to the at least one separating stop such that when the actuating means is actuated, a movement of the at least one separating stop from the position below the conveying plane to the position above the conveying plane is possible. For this purpose, a latch can for example be provided which allows this movement and additionally causes a movement of the at least one separating stop from the position above the conveying plane to the position below the conveying plane to be blocked when the actuating means is actuated.

The first actuating member can in particular be arranged and embodied such that it can be moved, by conveyed items being moved in the conveying direction and in particular conveyed items entering the removal station from the conveying part, from its unactuated position in which it is situated at least partially above the conveying plane, to its actuated position. When or as the actuating means is actuated, the first actuating member can for example be moved from the position above the conveying plane to a position below or flush with the conveying plane, in particular the actuated position. The position in which the first actuating member is below the conveying plane is to be understood to include the position in which it is flush with the conveying plane.

The second actuating member can in particular be arranged and embodied such that it can be moved, by conveyed items being moved counter to the conveying direction and in particular by conveyed items being returned to the removal station by an operator, from its unactuated position in which it is situated at least partially above the conveying plane, to its actuated position. When or as the actuating means is actuated, the second actuating member can be moved from the position above the conveying plane to a position below or flush with the conveying plane, in particular the actuated position. The position in which the second actuating member is below the conveying plane is to be understood to include the position in which it is flush with the conveying plane.

The actuation means can be actuated by actuating one of the first actuating member and the second actuating member, i.e. it need not be necessary to actuate both actuating members, but rather only one of the two, in order to actuate the actuating means.

Since, in accordance with the invention, the actuating means comprises a second actuating member, it can be actuated by conveyed items being moved counter to the conveying direction, such that it is made possible to return conveyed items to the removal station while actuating the actuating means. This advantageously enables a movement of the at least one separating stop from the position above the conveying plane to the position below the conveying plane to be blocked, thus enabling the separating stop to be activated, i.e. to perform its separating function, by returning conveyed items to the conveying means.

The first actuating member and second actuating member can optionally be coupled to each other, in particular interactively, for example mechanically or via articulation, such that moving the first actuating member into its actuated position causes the second actuating member to be moved into its actuated position and/or such that moving the second actuating member into its actuated position causes the first actuating member to be moved into its actuated position. Actuating one of the first actuating member and second actuating member thus causes the other of the first and second actuating members to be actuated. Irrespective of which of the first and second actuating members is actuated, the first and second actuating members are moved, in particular pivoted, into their actuated position. This advantageously prevents the first actuating member from being moved or pivoted, by conveyed items being moved counter to the conveying direction, counter to the direction envisaged for actuating it, thus preventing the first actuating member from being damaged. Equally, this prevents the second actuating member from being moved or pivoted, by conveyed items being moved in the conveying direction, counter to the direction envisaged for actuating it, thus preventing the second actuating member from being damaged by conveyed items being moved in the conveying direction.

The first actuating member can for example be pivotable relative to the conveying plane or a framework of the separating device. Alternatively or additionally, the second actuating member can be pivotable relative to the conveying plane or a framework of the separating device. Alternatively, the first actuating member and/or the second actuating member can be linearly movable relative to the conveying plane or a framework.

In embodiments in which the first actuating member and the second actuating member can be pivoted relative to the conveying plane, the first actuating member and the second actuating member can preferably be pivoted in opposite directions. Alternatively or additionally, the first actuating member and the second actuating member can be pivotable relative to each other.

The first actuating member and the second actuating member can for example be connected to each other via a joint, thus enabling the first actuating member and the second actuating member to be moved, in particular pivoted and/or shifted, relative to each other. The first actuating member and the second actuating member can for example together form the joint.

In developments, the joint can be a pivot joint, in particular a pivot bearing, the pivot axis of which is spatially fixed in relation to the first actuating member and the second actuating member. The pivot joint can be embodied such that it allows one (1) rotational degree of freedom and no (0) translational degrees of freedom. The pivot joint is embodied, i.e. configured, such that the first actuating member and the second actuating member are pivoted relative to each other when the first actuating member and/or the second actuating member are moved, in particular back and forth, between the respective unactuated position and the actuated position. The pivot joint can be a pivot bearing.

One of the first actuating member and the second actuating member can for example be connected to a framework of the separating device via a pivot joint, in particular a pivot bearing, the pivot axis of which is spatially fixed in relation to the conveying plane, wherein the other of the first actuating member and the second actuating member can be connected to the framework via a plunging pivoting joint, in particular a pivot-plunging bearing, the pivot axis of which can be shifted in relation to the conveying plane. The pivot joint preferably allows one (1) rotational degree of freedom and no (0) translational degrees of freedom. The plunging pivoting joint preferably allows one (1) rotational degree of freedom and one (1) or at least one translational degree of freedom. The pivot axis of the pivot joint via which the actuating member is connected to the framework can be spatially fixed in relation to the actuating member and the framework. The pivot axis of the plunging pivoting joint via which the actuating member is connected to the framework can be spatially fixed in relation to the actuating member but shiftable in relation to the framework. In embodiments in which one of the first and second actuating members is connected to the framework via a pivot joint and in which the first and second actuating members are connected to a pivot joint, the plunging pivoting joint via which the remaining actuating member is connected to the framework performs a length adjustment which is necessary for the movement of the first and second actuating members from the unactuated position to the actuated position. This length adjustment can for example be used to move a transmission member, via which the actuating means can be coupled to the separating stop, when the actuating member is actuated. The transmission member can in particular be fastened or coupled to the actuating member which is connected to the framework by the plunging pivoting joint.

In an alternative embodiment, the joint via which the first actuating member and the second actuating member are connected to each other can be a plunging pivoting joint (one (1) rotational degree of freedom and one (1) or at least one translational degree of freedom). The plunging pivoting joint can be embodied such that the first actuating member and the second actuating member are pivoted (one rotational degree of freedom) and shifted (one translational degree of freedom) relative to each other when the first actuating member and the second actuating member are moved, in particular pivoted, between the respective unactuated position and actuated position.

One of the first and second actuating members can for example be connected to the framework of the separating device via a pivot joint (one rotational degree of freedom), the pivot axis of which is spatially fixed in relation to the conveying plane or the framework. The other of the first and second actuating members can be connected to the framework via an(other) pivot joint, the pivot axis of which is spatially fixed in relation to the conveying plane or the framework and in particular offset in parallel with respect to the pivot axis of the other actuating member.

In such an embodiment, the plunging pivoting joint via which the first actuating member and the second actuating member are connected to each other performs the length adjustment when the actuating member is actuated. The pivot joint can then again be a rotary bearing or pivot bearing. The pivot axis of the pivot joint via which the first actuating member is connected to the framework can be spatially fixed in relation to the first actuating member and the framework. The pivot axis of the pivot joint via which the second actuating member is connected to the framework can be spatially fixed in relation to the first actuating member and the framework.

The pivot axis of the plunging pivoting joint via which the first and second actuating members are connected to each other can be spatially fixed in relation to either the first actuating member or the second actuating member, while the pivot axis can be translationally shiftable in relation to the other of the first and second actuating members when the actuating means or one of the actuating members is actuated.

The first actuating member can for example rest on the second actuating member, in particular on a joint structure of the second actuating member, for example a journal or a ring which is rotatably arranged on the journal, or vice versa, i.e. the second actuating member can rest on the first actuating member, in particular on a joint structure of the first actuating member, for example a journal or a ring which is rotatably arranged on the journal. In this way, the actuating member can for example take along with it the actuating member on which it rests, when it is actuated. If the actuating member on which the other of the two actuating members rests is actuated, the overlying actuating member is moved, in particular pivoted, from the unactuated position to the actuated position by the force of gravity acting on it. The transmission member can for example be fastened or coupled to the actuating member on which the other of the two actuating members rests, for the gravity of the overlying actuating member can in some cases—depending on the dimensions of the actuating member—be insufficient to move the transmission member solely due to the force of gravity of the overlying actuating member. It is therefore advantageous to fasten the transmission member to the actuating member on which the other of the two actuating members rests. If the actuating member on which the other actuating member rests is actuated, the force exerted by the conveyed items can be used to move the transmission member, while the other of the two actuating members is moved into the actuated position solely by its force of gravity. When the conveyed items actuate the overlying actuating member, the latter takes the other of the two actuating members, to which the transmission member is coupled, along with it, thus moving the transmission member.

As an alternative to an actuating member which rests on the other actuating member due to gravity, the first actuating member and the second actuating member can be forcibly guided, one on the other, for example by means of a journal or guide member on one of the two actuating members which engages a groove or guide track on the other of the two actuating members. The transmission member can then be fastened or coupled to one of the two actuating members.

In developments, the first actuating member can comprise a first frame and/or the second actuating member can comprise a second frame. The respective frame can be connected to the framework via the pivot joint or the plunging pivoting joint. The pivot axis of the joint via which the first frame is connected to the framework can be spatially fixed in relation to the first frame. The pivot axis of the joint via which the second frame is connected to the framework can be spatially fixed in relation to the second frame.

In particular, one or more rollers can be rotatably fastened to the first frame and/or one or more rollers can be rotatably fastened to the second frame. The at least one roller can be rotated about its respective axis of rotation relative to the frame to which it is fastened. The one or more rollers are arranged such that they roll off or can roll off on the items to be conveyed when the first actuating member and/or the second actuating member is in its respective actuated position or is moved into its respective actuated position. The at least one roller of the first frame and/or the at least one roller of the second frame can in particular be tangent to the conveying plane.

Alternatively or additionally, the first actuating member can comprise a first sliding surface and/or the second actuating member can comprise a second sliding surface. The respective sliding surface is arranged such that the items to be conveyed can slide off on it when the first actuating member and/or the second actuating member is in its respective actuated position or is moved into its respective actuated position. The first sliding surface can for example be formed on or fastened to the first frame and/or the second sliding surface can be formed on or fastened to the second frame. The first actuating member can for example comprise either a first sliding surface or at least one roller or a first sliding surface and at least one roller. Alternatively or additionally, the second actuating member can comprise either a second sliding surface or at least one roller or a second sliding surface and a roller.

The separating device can for example comprise a transmission member, wherein the actuating means, in particular the first actuating member or the second actuating member, is coupled to the at least one separating stop by means of the transmission member in such a way that when the actuating means is actuated, a movement of the separating stop from the position above the conveying plane to the position below the conveying plane is blocked, and when the actuating member is unactuated, a movement of the separating stop from the position above the conveying plane to a position below the conveying plane is enabled. The transmission member can for example be fastened, such that it can be pivoted, to one of the first and second actuating members, in particular such that it can be pivoted about a pivot axis which is spaced from and/or parallel to the pivot axis of the pivot joint or plunging pivoting joint via which the actuating member is fastened to the framework. If the actuating member is fastened to the framework via a plunging pivoting joint, the pivot axis about which the transmission member is pivotably fastened to the actuating member can optionally be the pivot axis of the plunging pivoting joint.

Actuating the actuating member causes the transmission member to be moved relative to the framework, in particular along or parallel to the conveying plane.

As already mentioned, the transmission member can be fastened, preferably pivotally, to one of the first and second actuating members, on which the other of the first and second actuating members rests. It is generally advantageous for the transmission member to be fastened, in particular pivotably, to one of the first and second actuating members.

The at least one actuating member is connected to a latch by means of the transmission member, wherein the transmission member and the latch can be shifted along the conveying plane by means of actuating the actuating means. In particular, the latch and/or the transmission member can be moved, in particular back and forth, or shifted by means of actuating the actuating member, i.e. by means of moving the first and/or second actuating member between a release position and a blocking position. When the actuating means is unactuated, the transmission member and/or the latch is/are in the release position. When the actuating means is actuated, the transmission member and/or the latch is/are in the blocking position. The latch blocks the movement of the separating stop from the position above the conveying plane to the position below the conveying plane when the transmission member and/or the latch is/are in the blocking position. The latch enables the movement of the separating stop, in particular from its position below the conveying plane to the position above the conveying plane, when the transmission member and/or the latch is/are in the release position.

In a development, the transmission member can be coupled to the actuating means such that the transmission member is moved together with the latch counter to the conveying direction when the actuating means is moved or reset from the actuated position to the unactuated position, and in the conveying direction when the actuating means is actuated.

The latch can for example be movable or pivotable relative to the transmission member. The transmission member can for example comprise a bearing structure on which the latch is formed or to which the latch is fastened. The latch can in particular be pivotable about an axis of rotation which is spatially fixed relative to the bearing structure or the transmission member. The latch can be configured such that when the actuating member is actuated or the transmission member or bearing structure is in the blocking position, a movement of the at least one separating stop from the position below the conveying plane to the position above the conveying plane is possible, in particular by deflecting the latch, in particular in a linear or pivoting movement of the latch. The latch can for example be linearly movable or pivotable in relation to the transmission member, in particular about an axis of rotation which is spatially fixed with respect to the bearing structure or the transmission member. A separating stop support can be provided which comprises the separating stop and the blocking stop. When the actuating member is actuated, the latch can enable a movement of the at least one separating stop from the position below the conveying plane to the position above the conveying plane by being moved or pivoted by the separating stop support or the blocking stop of the separating stop support relative to the bearing structure or transmission member, i.e. the latch is deflected by the separating stop support, in particular the blocking stop of the separating stop support, when the separating stop is moved from the position below the conveying plane to the position above the conveying plane. A movement of the separating stop from the position above the conveying plane to the position below the conveying plane is prevented by the blocking stop abutting against the latch, as long as the transmission member and the bearing structure are in the blocking position.

The separating stop support can be pivotable about a pivot axis which is fixed with respect to the framework and can exhibit a center of mass which is spaced from the pivot axis, such that the separating stop pivots into its position above the conveying plane due to the center of mass of the separating stop support. Alternatively or additionally, a spring can be provided which is tensioned when the separating stop support is moved from the position above the conveying plane to the position below the conveying plane, wherein the separating stop and/or separating stop support is or can be reset by the tensioned spring into its position above the conveying plane.

The separating device can comprise at least one resetting element which is embodied or configured to move the first actuating member and the second actuating member, or the actuating means in general, from the actuated position back to the unactuated position when the actuating member is unactuated, in particular when there are no conveyed items acting on the actuating means, in particular the actuating member of the actuating means.

The resetting element can for example be a spring which is tensioned by actuating the actuating means, wherein the spring which is tensioned in this way is capable of moving the first actuating member and the second actuating member, or the actuating means in general, from the actuated position back to the unactuated position. One end of the spring can for example be fastened to the framework of the separating device or conveyor, and the other end can be fastened to the transmission member or the bearing structure. The spring can be a tensile spring which is placed under tensile stress when the actuating means is actuated and the transmission member is correspondingly shifted. Alternatively, the spring can be a compression spring which is placed under compressive stress by actuating the actuating member. The energy stored in the spring can move or reset the actuating means from the actuated position back to the unactuated position.

The invention has been described on the basis of multiple preferred examples and embodiments. An embodiment of the invention is described below on the basis of figures. The features thus disclosed, individually and in any combination of features, advantageously develop the subject-matter of the invention and the claims. There is shown:

DETAILED DESCRIPTION OF THE INVENTION

Figure 5:
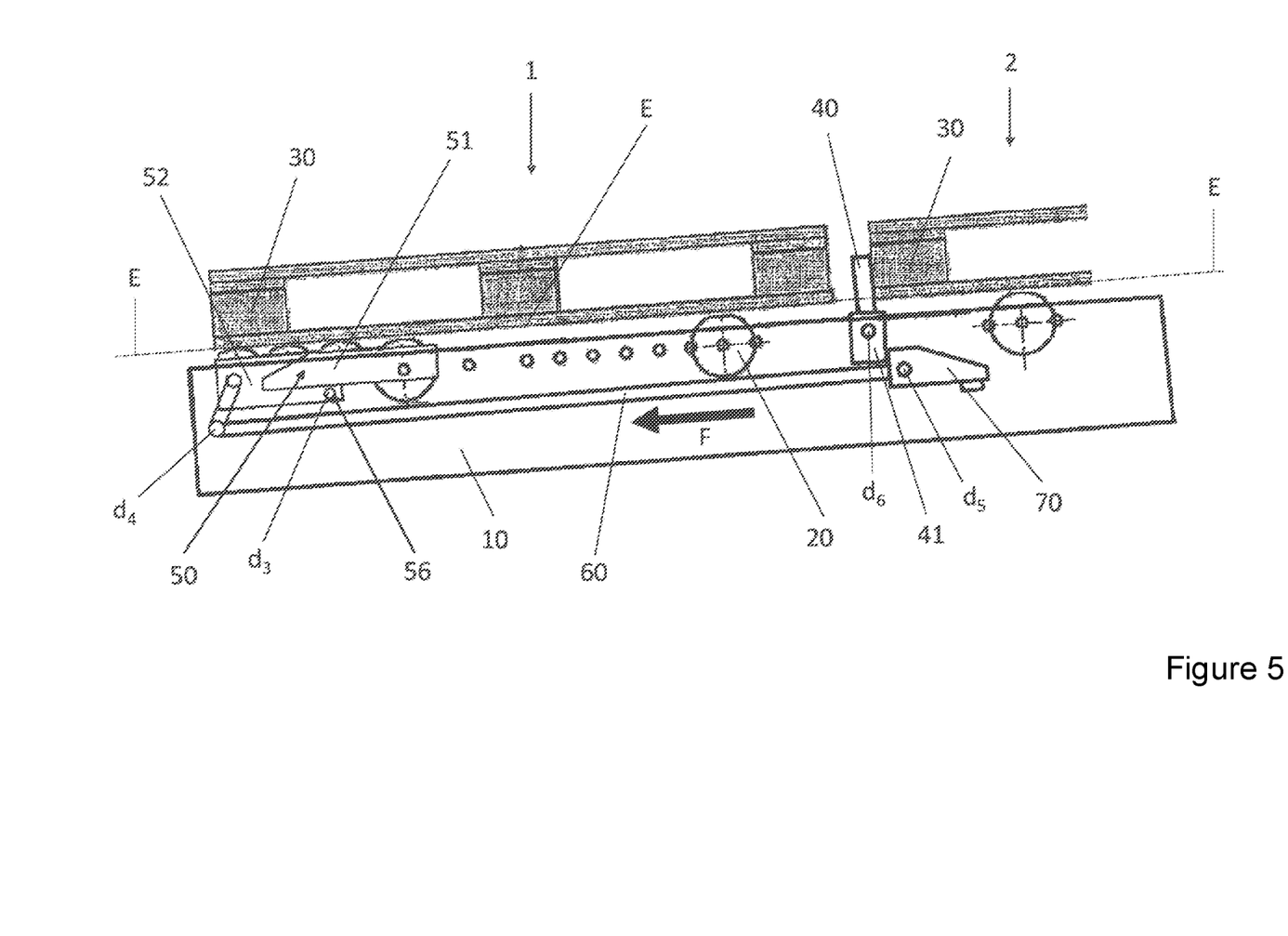
FIG. 5 a schematic drawing of a separating device, in a side view.

FIG. 5 shows a gravity conveyor which is embodied as a roller conveyor. The gravity conveyor includes a framework on which a plurality of conveying rollers 20 are arranged such that they can rotate about their respective axes of rotation. The framework 10 comprises two side walls between which the conveying rollers 20 are arranged and to which the conveying rollers 20 are fastened such that they can rotate relative to them. The tangent to the circumferences of the conveying rollers 20 forms a conveying plane E which is slightly inclined in relation to the horizontal, for example at an angle of between 2 and 10%, whereby items 30 to be conveyed—pallets in the example shown in FIG. 5—are conveyed by gravity in the conveying direction F along the conveying plane E. The lower side of the items 30 to be conveyed rolls off on the circumferences of the conveying rollers 20. The downward gradient force $F_{HA}$ which acts on the conveyed items 30 due to the force of gravity and the inclination of the conveying plane E relative to the horizontal is obtained as follows: $F_{HA}=F_G \cdot \sin \alpha$, where $\alpha$ is the angle of inclination of the conveying plane E relative to the horizontal and $F_G$ is the weight. Friction is disregarded in this calculation.

Figure 4:
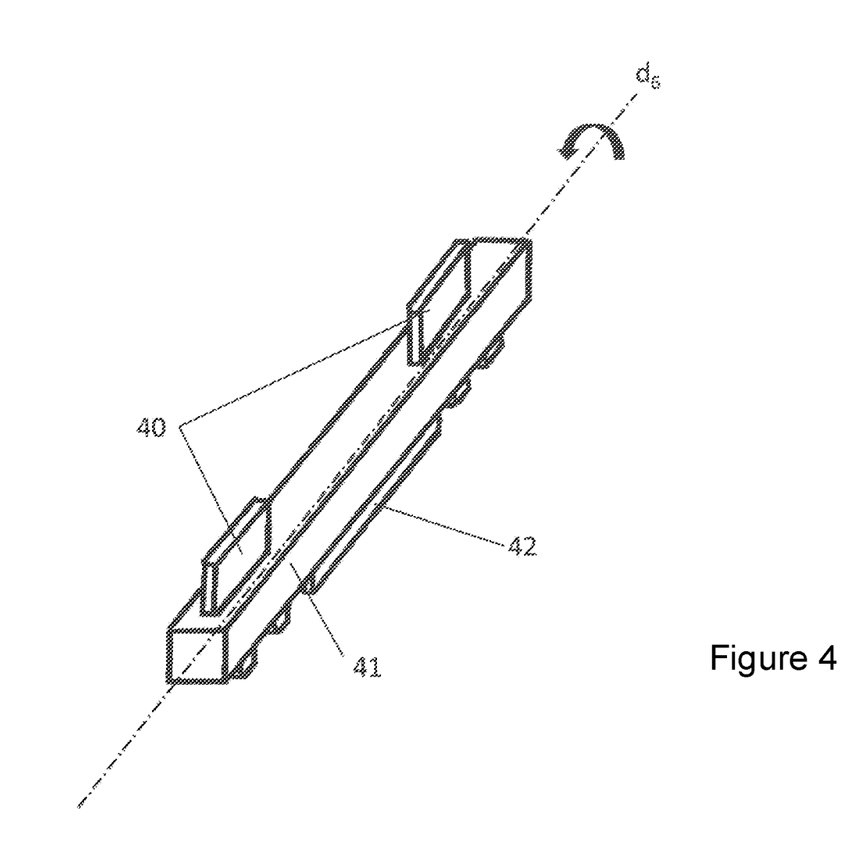
FIG. 4 a separating stop together with a separating stop support.

The gravity conveyor comprises a separating device which separates a removal station 1 from a conveying part 2 by means of at least one separating stop 40, such that the conveyed items 30 situated in the removal station 1 can be removed without an accumulation of pressure from the conveyed items 30 situated in the conveying part 2. In the example shown, two separating stops 40 are formed on one separating stop support 41. Alternatively, one separating stop 40 can be formed on or attached to the separating stop support 41, in particular in sections or continuously. In another alternative, more than two separating stops 40 can be formed on or attached to the separating stop support 41. The conveyed item 30 in the conveying part 2 which immediately follows the conveyed item 30 in the removal station 1 rests against the separating stop 40, thus channeling the accumulation of pressure caused by the conveyed item 30 in the conveying part 2 from the stop 40 into the framework 10. The separating stop 40 is situated in a gap between the conveyed item 30 situated in the removal station 1 and the immediately following conveyed item 30 situated in the conveying part 2.

The separating stop 40 can be moved and/or pivoted about a pivot axis $d_6$, which is arranged such that it is spatially fixed in relation to the framework 10, between a position in which the separating stop 40 is situated above the conveying plane E and a position in which the separating stop 40 is situated below the conveying plane E. The separating stop 40 can be blocked by a latch 70, which can be moved back and forth between a blocking position and a release position, from being pivoted about the pivot axis $d_6$ from the position above the conveying plane E to the position below the conveying plane E when the latch 70 is in the blocking position. When the latch 70 is shifted counter to the conveying direction F and along the conveying plane E from the blocking position to the release position, it releases the separating stop 40 for a pivoting movement from the position above the conveying plane E to the position below the conveying plane E. The separating stop 40 is pivoted into the position below the conveying plane E by the downward gradient force of the conveyed item 30 which is exerted on the separating stop 40, thus conveying the conveyed item 30 from the conveying part 2 to the removal station 1.

Figure 2:
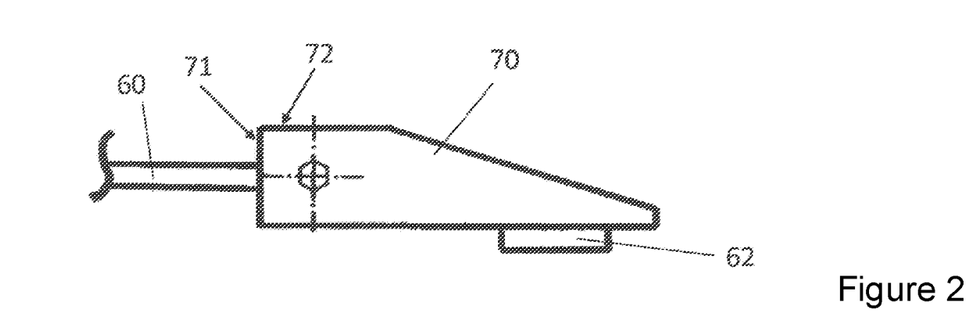
FIG. 2 a side view of a transmission member comprising a latch.

The at least one separating stop 40 is formed by a separating stop support 41 which can be pivoted about the pivot axis $d_6$ in a corresponding way to the separating stop 40. The separating stop support 41 forms a blocking stop 42 which rests or can rest against a stop surface 71 of the latch 70 when the latch 70 is in the blocking position. When the latch 70 is moved into the release position, the blocking stop 42 can no longer rest against the stop surface 71 of the latch 70, thus enabling the separating stop 40 to be pivoted from the position above the conveying plane E to the position below the conveying plane E.

If the separating stop 40 is in the position below the conveying plane E and the latch 70 has been shifted into its blocking position, the separating stop support 41 and/or the separating stop 40 can be pivoted about the pivot axis $d_6$ into the position above the conveying plane E, wherein the separating stop support 41 or the blocking stop 42 of the separating stop support 41 abuts against a surface 72 of the latch 70 (FIG. 2) during this pivoting movement and slides along the surface 72, thus pivoting or deflecting the latch 70 about a pivot axis $d_5$, wherein the latch 70 is lifted off a bearing support of the bearing structure 61. Once the separating stop support 41 has been pivoted past the latch 70, the latch 70 returns to its original position on the bearing support 62, for example due to gravity or due to the restoring force of a spring acting on it. In this position, the blocking stop 42 can again abut against the stop surface 71 of the latch 70, thus blocking the separating stop 40 from pivoting into the position below the conveying plane E.

Figure 3:
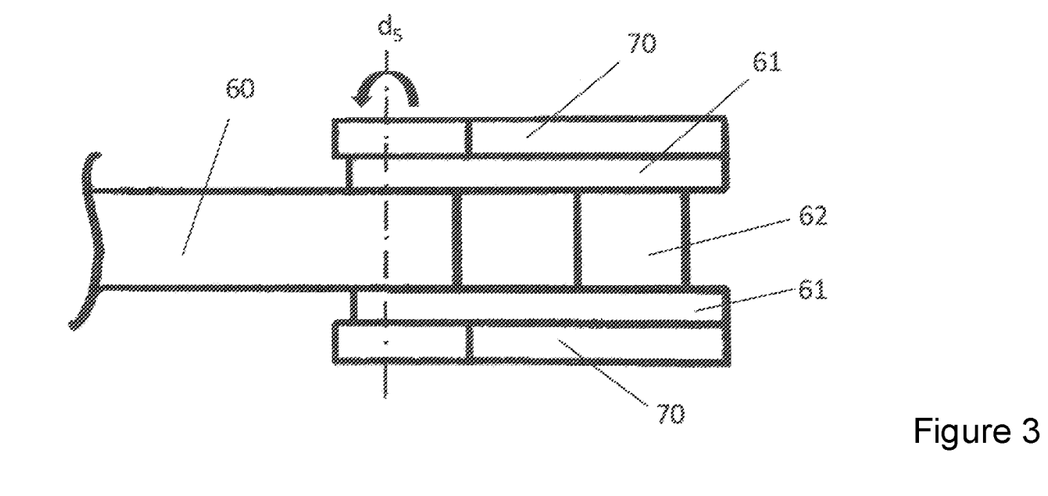
FIG. 3 a top view of the transmission member comprising the latch.

The pivot axis $d_5$ is spatially fixed in relation to a bearing structure 61 which pivotably mounts the latch 70. The bearing structure 61 is formed by a transmission member 60 or is connected to the transmission member 60. The transmission member 60, the bearing structure 61 and the latch 70 can be moved back and forth along the conveying plane E between the blocking position and the release position in accordance with the movement of the latch 70.

The separating device comprises an actuating means 50 which is coupled to the at least one separating stop 40 in such a way that when the actuating means 50 is actuated (FIG. 5), a movement of the at least one separating stop 40 from the position above the conveying plane E to the position below the conveying plane E is blocked, and when the actuating means 50 is unactuated, i.e. when the pallet 30 shown in FIG. 5 has been removed from the removal station 1, a movement of the at least one separating stop 40 from the position above the conveying plane E to the position below the conveying plane E is enabled. The actuating means 50 is connected to the latch 70 via the transmission member 60.

When the actuating means 50 is actuated, the transmission member 60 and the latch 70 are shifted in the conveying direction F into the blocking position (FIG. 5). When the actuating means 50 is unactuated (FIG. 1), the transmission member 60 and the latch 70 are shifted counter to the conveying direction F into the release position.

Figure 6:
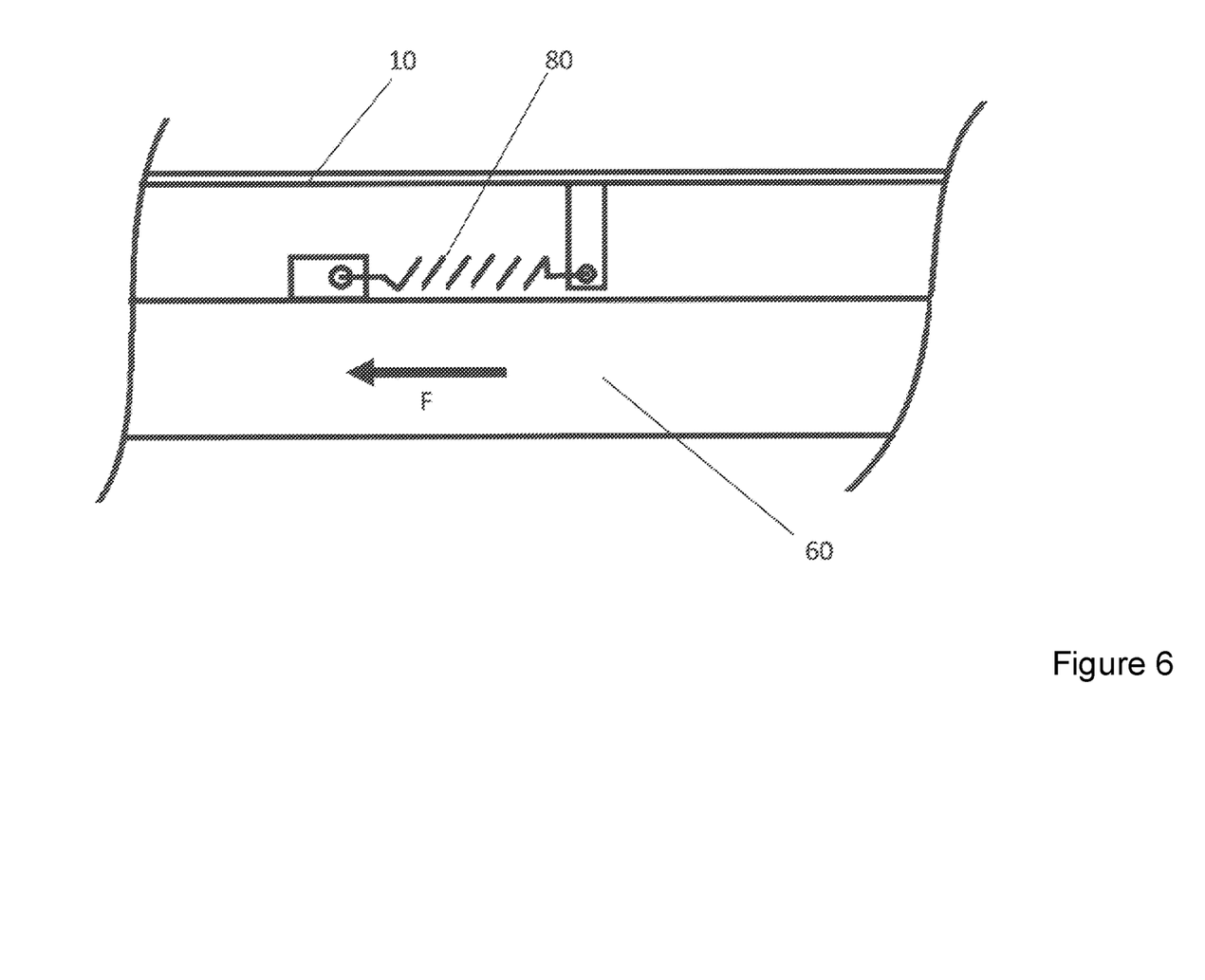
FIG. 6 a schematic drawing of the transmission member and a resetting element.

FIG. 6 shows a resetting element 80 in the form of a spring which in this case acts as a tensile spring. One end of the spring is connected to the framework, and the other end of the spring is connected to the transmission member 60. When the transmission member 60 is shifted into the blocking position and/or when the actuating means 50 is actuated, the spring is tensioned. When the actuating means 50 is no longer actuated, in particular when the conveyed item 30 is removed from the removal station 1, the spring force moves the transmission member 60 and the latch 70 into the release position and returns the actuating means 50 to the unactuated position.

Figure 1:
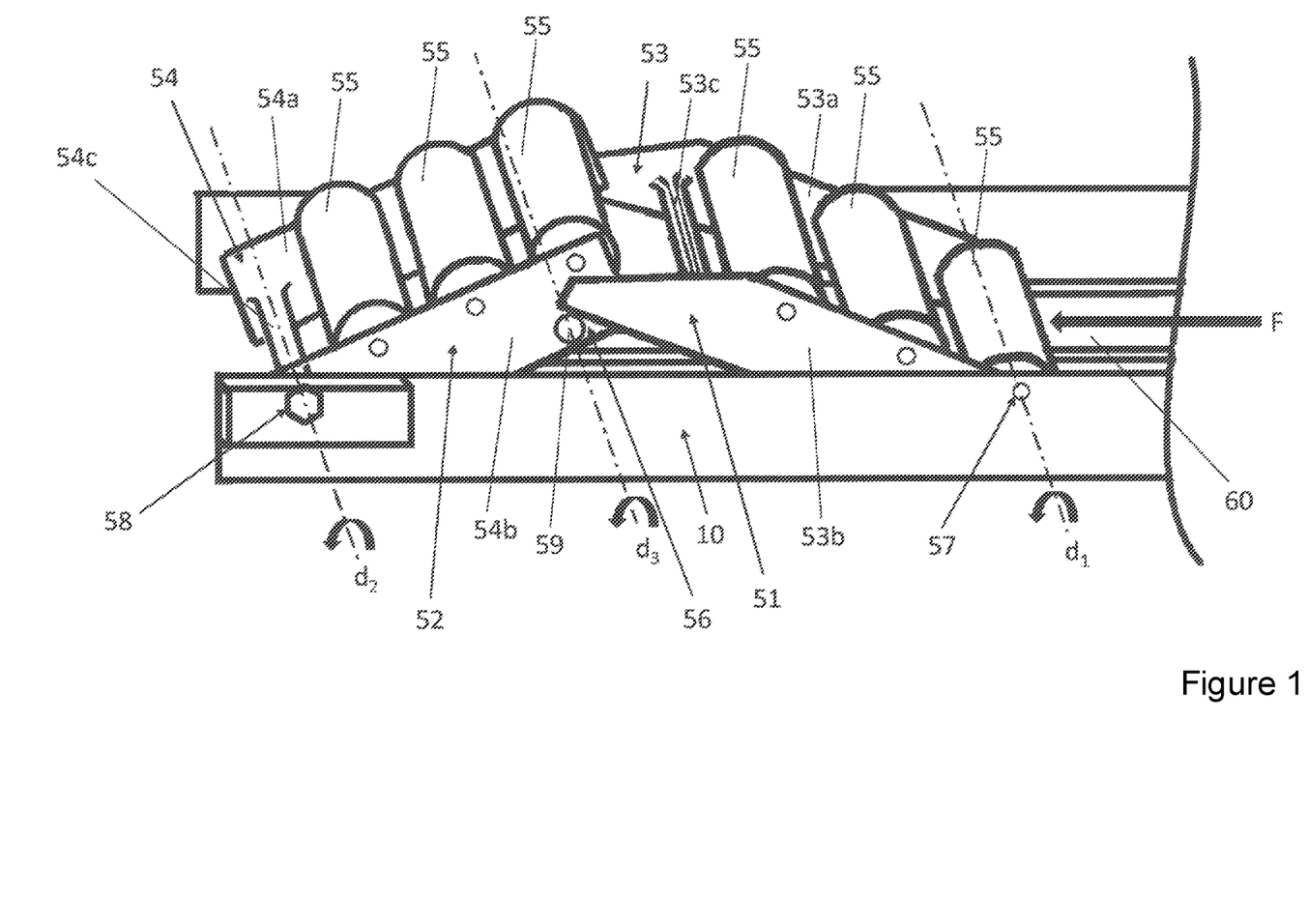
FIG. 1 a schematic drawing of an actuating means of a separating device.

A preferred actuating means 50, such as is shown in FIG. 1, comprises a first actuating member 51 and a second actuating member 52. The first actuating member 51 is arranged and embodied such that it can be moved from its unactuated position (FIG. 1), in which the actuating member 51 is at least partially situated above the conveying plane E, to its actuated position by conveyed items 30 moving in the conveying direction F. The first actuating member 51 is usually actuated by the conveyed items 30 moving from the conveying part 2 to the removal station 1.

The second actuating member 52 is moved from its unactuated position, in which it is at least partially situated above the conveying plane E, into its actuated position by conveyed items 30 moving counter to the conveying direction F. The second actuating member 52 is usually moved by conveyed items to be conveyed being returned to the removal station 1 counter to the conveying direction F, having for example been removed from the removal station 1 erroneously or by mistake.

The first actuating member 51 and the second actuating member 52 are coupled to each other such that moving the first actuating member 51 into its actuated position moves the second actuating member 52 into its actuated position, and moving the second actuating member 52 into its actuated position, with the aid of gravity, moves the first actuating member 51 into its actuated position. This ensures that both actuating members 51, 52 are always moved into their actuated position, irrespective of which of the two actuating members 51, 52 is actuated. The first actuating member 51 can be pivoted, in particular relative to the framework 10 of the separating device, about a pivot axis $d_1$ which is spatially fixed in relation to the conveying plane E and/or the framework 10. The second actuating member 52 can be pivoted, in particular relative to the framework 10, about a pivot axis $d_2$ which is offset in parallel from the pivot axis $d_1$ of the first actuating member 51 and spatially fixed in relation to the second actuating member 52 and the conveying plane E and/or the framework 10 of the separating device. The first actuating member 51 and the second actuating member 52 are connected to each other via a joint 56 which is embodied as a plunging pivoting joint, whence the first actuating member 51 and the second actuating member 52 can be pivoted and shifted relative to each other.

The first actuating member 51 rests on the second actuating member 52, in particular on a bearing structure 59 of the second actuating member. Actuating the first actuating member 51 pivots the first actuating member 51 from the unactuated position to the actuated position, wherein it takes the second actuating member 52 along with it in the process, thus pivoting the second actuating member 52 into the actuated position. If the second actuating member 52 is actuated, it pivots downwards, thus also pivoting the first actuating member 51 into the actuated position due to its gravity.

The transmission member 60 is connected to the second actuating member 52 such that it can be pivoted about a pivot axis $d_4$, wherein the pivot axis $d_4$ is spaced and in particular offset in parallel from the pivot axis $d_2$. This causes the transmission member 60 to be moved along the conveying plane E when the second actuating member 52 is pivoted about the pivot axis $d_2$.

This means that when the actuating means 50 is actuated, the latch 70 is moved into the blocking position, and when the transmission member 60 or the actuating means 50 is reset, the latch 70 is moved into the release position.

The first actuating member 51 comprises a first frame 53 which includes two side walls 53a, 53b between which multiple rollers 55 are arranged such that they can be rotated about their respective axes of rotation. The side walls 53a, 53b of the frame 53 can advantageously be connected by means of one or more connecting stays 53c in order to give the frame 53 the necessary stability.

The second actuating member 52 comprises a frame 54 which includes two side walls 54a, 54b between which multiple rollers 55 are arranged such that they can be rotated about their respective axes of rotation. The side walls 54a, 54b of the frame 54 can advantageously be connected by means of one or more connecting stays 54c in order to give the frame 54 the necessary stability.

The second actuating member 52 or the frame 54 of the second actuating member 52 comprises a joint structure 59 in the form of a bearing journal on which the first actuating member 51, in particular the frame 53 or a side wall 53a; 53b of the frame 53, rests. The first actuating member 51 or the frame 53 of the first actuating member 51 can rest directly against the circumference of the bearing journal which is for example fixed in relation to the frame 54 of the second actuating member 52, whereby for example sliding friction occurs between the first actuating member 51 and the bearing journal, in particular the circumferential surface of the bearing journal, when the first and second actuating members 51, 52 are pivoted, or the first actuating member 51 or the frame 53 of the first actuating member 51 can rest on a ring which is rotatably mounted on the bearing journal, such as for example the outer ring of a roller bearing arranged on the bearing journal, whereby for example rolling friction occurs between the first actuating member 51 and the joint structure 59, in particular the ring. In both cases, a plunging pivoting joint is formed between the first actuating member 51 and the second actuating member 52. The first axis of rotation $d_1$ and the second axis of rotation $d_2$, as well as the third axis of rotation $d_3$, can in particular be arranged parallel to each other and in particular parallel to the conveying plane E. The pivot axes $d_4$, $d_5$ and $d_6$ are advantageously parallel to each other and/or parallel to the conveying plane E.

The second frame 54 or the walls 54a, 54b of the second frame 54 can for example be arranged between the walls 53a, 53b of the first frame 53. A joint structure 59 can project from each of the walls 54a, 54b of the second frame 54, in particular from the side of each wall 54a, 54b which faces away from the other wall 54a, 54b. The second frame 54 can for example comprise a first wall 54a and a second wall 54b, wherein the joint structure 59 of the first wall 54a is arranged on the side of the first wall 54a which faces away from the second wall 54b, and wherein the joint structure 59 of the second wall 54b can be arranged on the side of the second wall 54b which faces away from the first wall 54a. This advantageously enables the first wall 53a of the first frame 53 to rest on the joint structure 59 of the first wall 54a of the second frame 54, and the second wall 53b of the first frame 53 to rest on the joint structure 59 of the second wall 54b of the second frame 54.

The framework 10 of the separating device can comprise a first wall 10a and a second wall 10b, wherein a gap which is formed between the first wall 54a of the second frame 54 and the first wall 10a of the framework 10 is wide enough that there is space within it for the joint structure 59 and the first wall 53a of the first frame 53. A gap can correspondingly also be formed between the second wall 54b of the second frame 54 and the second wall 10b of the framework 10.

A plane which is tangential to the outer circumferences of the rollers 55 of the first actuating member 51 forms a first actuating plane. A plane which is tangential to the outer circumferences of the rollers 55 of the second actuating member 52 forms a second actuating plane. When the actuating means 50 is unactuated, the angle between the first actuating plane and the part of the conveying plane E which is downstream of the pivot axis $d_1$ in relation to the conveying direction F can be smaller than 90°, in particular smaller than 45°, but greater than 0°. Alternatively or additionally, when the actuating means 50 is unactuated, the angle between the second actuating plane and the part of the conveying plane E which is upstream of the pivot axis $d_2$ in relation to the conveying direction F can be less than 90°, in particular less than 45°, but greater than 0°. When the actuating means 50 is actuated, the first and second actuating planes can for example be parallel to the conveying plane E or can coincide with the conveying plane E.

LIST OF REFERENCE SIGNS 1 removal station
2 conveying part
10 framework of the separating device
10a first wall
10b second wall
20 guides/conveying rollers
30 items to be conveyed
40 separating stop
41 separating stop support
42 blocking stop
50 actuating means
51 first actuating member
52 second actuating member
53 first frame
53a first wall
53b second wall
53c connecting stay
54 second frame
54a first wall
54b second wall
54c connecting stay
55 roller
56 joint
57 first pivot joint
58 second pivot joint
59 joint structure
60 transmission member
61 bearing structure
62 bearing support
70 latch 71 stop surface
72 surface/gear surface
80 resetting element/spring
$d_1$ first pivot axis
$d_2$ second pivot axis
$d_3$ third pivot axis
$d_4$ fourth pivot axis
$d_5$ fifth pivot axis
$d_6$ sixth pivot axis
E conveying plane
F conveying direction

The invention claimed is:

1. A separating device for a gravity conveyor, comprising:
   a) a conveying plane which is defined by at least two guides for conveying an item to be conveyed and along which the item to be conveyed can be moved in a conveying direction;
   b) at least one separating stop which can be moved between a position above the conveying plane and a position below or flush with the conveying plane;
   c) an actuating means which, in order to be actuated, comprises a first actuating member and a second actuating member and which is coupled to the at least one separating stop by means of a transmission member and a latch, wherein, when the actuating means is actuated by actuating at least one of the first and second actuating members, the transmission member and the latch are moved along the conveying plane such that the latch is moved into a blocking position, wherein the latch blocks a movement of the at least one separating stop from the position above the conveying plane to the position below or flush with the conveying plane when the latch is in the blocking position, and when the actuating means is unactuated, a movement of the at least one separating stop from the position above the conveying plane to the position below or flush with the conveying plane is enabled,
   d) wherein the first actuating member can be moved, by conveyed items being moved in the conveying direction, from its unactuated position in which it is situated at least partially above the conveying plane, to its actuated position,
   e) wherein the second actuating member can be moved, by conveyed items being moved counter to the conveying direction, from an unactuated position of the first actuating member in which the second actuating member is situated at least partially above the conveying plane, to an actuated position of the first actuating member.

2. The separating device according to claim 1, wherein the conveying plane is inclined in relation to the horizontal, whereby the items to be conveyed can be moved in the conveying direction along the conveying plane by the force of gravity acting on the conveyed items.

3. The separating device according to claim 1, wherein the first actuating member can be pivoted relative to the conveying plane and/or the second actuating member can be pivoted relative to the conveying plane.

4. The separating device according to claim 1, wherein the first actuating member and the second actuating member can be pivoted relative to each other.

5. The separating device according to claim 1, wherein the first actuating member comprises a first frame and/or the second actuating member comprises a second frame, wherein one or more rollers are rotatably fastened to the first frame and/or one or more rollers are rotatably fastened to the second frame, wherein the one or more rollers are arranged such that they can roll off on the items to be conveyed when the first actuating member and/or the second actuating member is in the respective actuated position or is moved into the respective actuated position.

6. The separating device according to claim 1, wherein the first actuating member comprises a first sliding surface and/or the second actuating member comprises a second sliding surface, wherein the sliding surface is arranged such that the items to be conveyed can slide off on the first or second sliding surfaces when the first actuating member and/or the second actuating member is in the respective actuated position or is moved into the respective actuated position.

7. The separating device according to claim 1, further comprising at least one resetting element which is configured to move the first actuating member and the second actuating member from the actuated position back to the unactuated position.

8. The separating device according to claim 7, wherein the resetting element is a spring which is tensioned by actuating the actuating means, wherein the spring which is tensioned in this way is capable of moving the first actuating member and the second actuating member from the actuated position back to the unactuated position.

9. The separating device according to claim 1, wherein the at least two guides comprise sliding guides.

10. The separating device according to claim 1, wherein the at least two guides comprise conveying rollers.

11. The separating device according to claim 1, wherein the first actuating member and second actuating member are coupled to each other, such that moving the first actuating member into the actuated position causes the second actuating member to be moved into the actuated position and/or such that moving the second actuating member into the actuated position causes the first actuating member to be moved into the actuated position.

12. The separating device according to claim 11, wherein the first actuating member and the second actuating member are connected to each other via a joint.

13. The separating device according to claim 12, wherein the joint is a pivot joint, the pivot axis of which is spatially fixed in relation to the first actuating member and the second actuating member, and which is configured such that the first actuating member and the second actuating member are pivoted relative to each other when the first actuating member and the second actuating member are moved between the respective unactuated position and actuated position or the actuating means is actuated.

14. The separating device according to claim 13, wherein one of the first actuating member and the second actuating member is connected to a framework of the separating device via a pivot joint, the pivot axis of which is spatially fixed in relation to the conveying plane, and the other of the first actuating member and the second actuating member is connected to the framework via a plunging pivoting joint, the pivot axis of which can be shifted in relation to the conveying plane.

15. The separating device according to claim 12, wherein the joint is a plunging pivoting joint which is embodied such that the first actuating member and the second actuating member are pivoted and shifted relative to each other when the first actuating member and the second actuating member are moved between the respective unactuated position and actuated position or the actuating means is actuated.

16. The separating device according to claim 15, wherein the pivot axis of the plunging pivoting joint is spatially fixed in relation to either the first actuating member or the second actuating member.

17. The separating device according to claim 15, wherein the first actuating member is connected to a framework of the separating device via a pivot joint, the pivot axis of which is spatially fixed in relation to the conveying plane, and the second actuating member is connected to the framework via a pivot joint, the pivot axis of which is spatially fixed in relation to the conveying plane.

18. The separating device according to claim 15, wherein the first actuating member rests on a joint structure of the second actuating member, or the second actuating member rests on a joint structure of the first actuating member.

19. The separating device according to claim 18, wherein the transmission member is pivotably fastened to said one of the first and second actuating members on which joint structure the other of the first and second actuating members rests.

20. The separating device according to claim 19, wherein the actuating means is connected to the latch by means of the transmission member, wherein the transmission member and the latch can be shifted along the conveying plane by means of actuating the actuating means.

21. The separating device according to claim 20, wherein the transmission member can be moved by means of moving the first and/or second actuating member between a release position and the blocking position, wherein when the actuating means is unactuated, the transmission member is in the release position, and when the actuating means is actuated, the transmission member is in the blocking position, and wherein the latch blocks the movement of the separating stop into the position below or flush with the conveying plane when the transmission member is in the blocking position, and the latch enables the movement of the separating stop when the transmission member is in the release position.

22. The separating device according to claim 21, wherein the latch can be moved relative to a bearing structure of the transmission member, and can be pivoted about an axis of rotation which is spatially fixed with respect to the bearing structure or the transmission member, wherein when the actuating means is actuated, the latch enables a movement of the at least one separating stop from the position below or flush with the conveying plane to the position above the conveying plane, by being moved or pivoted relative to the bearing structure or transmission member by a blocking stop of a separating stop support which comprises the separating stop and the blocking stop.

23. The separating device according to claim 22, wherein a separating stop support comprises the separating stop and a blocking stop, wherein the separating stop support can be pivoted about a pivot axis which is fixed with respect to the framework and exhibits a center of mass which is spaced from the pivot axis, such that the separating stop pivots into its the position above the conveying plane due to the center of mass of the separating stop support.

\* \* \* \* \*